United States Patent
Shapiro

(10) Patent No.: US 12,542,880 B2
(45) Date of Patent: Feb. 3, 2026

(54) TECHNIQUE FOR NATURAL WHITEBOARD COLLABORATION

(71) Applicant: Radyx Ventures, LLC, Dallas, TX (US)

(72) Inventor: Ofer Shapiro, Nahalal (IL)

(73) Assignee: Radyx Ventures, LLC, Dallas, TX (US)

( * ) Notice: Subject to any disclaimer, the term of this patent is extended or adjusted under 35 U.S.C. 154(b) by 573 days.

(21) Appl. No.: 18/067,372

(22) Filed: Dec. 16, 2022

(65) Prior Publication Data

US 2023/0118500 A1 Apr. 20, 2023

Related U.S. Application Data

(63) Continuation of application No. PCT/US2021/037957, filed on Jun. 17, 2021.

(60) Provisional application No. 63/040,695, filed on Jun. 18, 2020.

(51) Int. Cl.
*G03B 21/14* (2006.01)
*H04L 65/401* (2022.01)
*H04N 7/14* (2006.01)
*H04N 9/31* (2006.01)

(52) U.S. Cl.
CPC ....... *H04N 9/3185* (2013.01); *H04L 65/4015* (2013.01); *H04N 7/142* (2013.01)

(58) Field of Classification Search
CPC .. H04L 65/4015; H04N 9/3185; H04N 7/142; G06Q 10/101; G06F 3/038; G03B 21/14
See application file for complete search history.

(56) References Cited

U.S. PATENT DOCUMENTS

| | | |
|---|---|---|
| 2005/0180631 A1 | 8/2005 | Zhang et al. |
| 2010/0017727 A1* | 1/2010 | Offer ............... H04L 65/1094 709/204 |
| 2015/0149929 A1 | 5/2015 | Shepherd et al. |
| 2016/0049082 A1 | 2/2016 | Leatherman, III |
| 2019/0356906 A1 | 11/2019 | Handa et al. |
| 2020/0021779 A1* | 1/2020 | Petrov ............... H04L 12/1813 |

FOREIGN PATENT DOCUMENTS

WO   WO 2020/068132 A1   4/2020

OTHER PUBLICATIONS

International Search Report dated Nov. 17, 2021 corresponding to International Patent Application No. PCT/US2021/037957.
Madni et al., "Design of Interactive Whiteboard System for Collaborative Learning", IEEE, 2014, retrieved on [Oct. 14, 2021]. Retrieved from the internet <URL: https://ieeexplore.ieee.org/stamp/stamp.jsp?tp=&arnumber-6868840> entire document.

* cited by examiner

*Primary Examiner* — Ryan D Howard
(74) *Attorney, Agent, or Firm* — Baker Botts L.L.P.

(57) ABSTRACT

Input device including a camera, a projector, and a Feedback Prevention Module (FPM) for remote collaboration adapted for displaying digital whiteboarding content. The camera provides a signal to the FPM, and the input device is connected to a backend system. The FPM prevents a feedback loop by analyzing the signal from the camera and masking an original portion of the signal which was previously projected, the masking preventing the original portion of the signal which was previously projected from reaching the backend system.

8 Claims, 2 Drawing Sheets

TECHNIQUE FOR NATURAL WHITEBOARD COLLABORATION

CROSS-REFERENCE TO RELATED APPLICATIONS

This application is a continuation of International Patent Application No. PCT/US2021/037957 filed Jun. 17, 2021, which claims priority to U.S. Provisional Application No. 63/040,695, filed Jun. 18, 2020, which is incorporated by reference herein in its entirety.

BACKGROUND

Systems for remote collaboration, such as web or video conferencing, often include "whiteboarding" features which allow multiple participants to draw on a single remote virtual canvas. A goal of virtual whiteboarding is to mimic the experience of collaborating on a single digital whiteboard remotely. A limiting factor for a natural user experience is the input device. Users can be challenged by drawing with a mouse or trackpad while simultaneously viewing their computer screen.

Tablets and large monitors or screens with high quality pens have been introduced but can be expensive and fail to mimic the natural feeling of collaboration. Whiteboard cameras have also been made available, but can provide only one way content sharing and do not allow remote participants to annotate on top of local images. Further, certain techniques do not address a scenario in which some of the participants are using a full-sized digital whiteboard.

SUMMARY

The disclosed subject matter includes an input device and a backend software system. The input device includes a high-resolution camera and a high-resolution projection device.

In some embodiments, the disclosed subject matter provides an input device including a camera, a projector, and a Feedback Prevention Module (FPM) for remote collaboration adapted for displaying digital whiteboarding content. The camera provides a signal to the FPM, and the input device is connected to a backend system. The FPM prevents a feedback loop by analyzing the signal from the camera and masking an original portion of the signal which was previously projected, the masking preventing the original portion of the signal which was previously projected from reaching the backend system.

In certain embodiments, the backend system is connected to the input device via an internet or wireless network connection. The input device can be connected to a computer running a collaboration software including video, audio and/or web conferencing. The FPM can further reduce visual feedback by regular calibration of a visual field by accounting for the distortion of a known image and/or by maintaining a block map of a projected image to mask a particular portion of the camera signal.

The disclosed subject matter also provides systems for mapping a legacy whiteboard for collaboration between participants, including a backend system, a legacy whiteboard, and a software only client. The legacy whiteboard can include a computer, smartphone, tablet or other electronic device running the software only client, a display screen, and a computer-based input or touch screen function on the smartphone running the software only client. The backend system can send a composited image of all participants to the legacy whiteboard system. The legacy whiteboard can display the composited image. When a legacy user of the legacy whiteboard draws content on top of the composited image, the content can be sent to the backend system and a difference will be a registered space for the legacy user of the legacy whiteboard.

In certain embodiments, the backend system receives a registered space from each participant in the collaboration. The registered space from each participant can be displayed or overlaid to selectively view annotations from specific participants.

BRIEF DESCRIPTION OF THE DRAWINGS

The subject matter of the application will be more readily understood from the following detailed description when read in conjunction with the accompanying drawings, in which:

FIG. 1 depicts several configurations of the input area 1 and input device 2.

DETAILED DESCRIPTION

Reference will now be made in detail to embodiments of the disclosed subject matter, an example of which is illustrated in the accompanying drawings. The disclosed subject matter will be described in conjunction with the detailed description of the system.

The apparatus, methods, and system presented herein can allow users to collaborate on a virtual whiteboard with remote participants. The disclosed subject matter is particularly suited for remote collaborations, such as web or video conferencing, which includes a virtual whiteboard in which participants can draw or write.

Figure 1A:
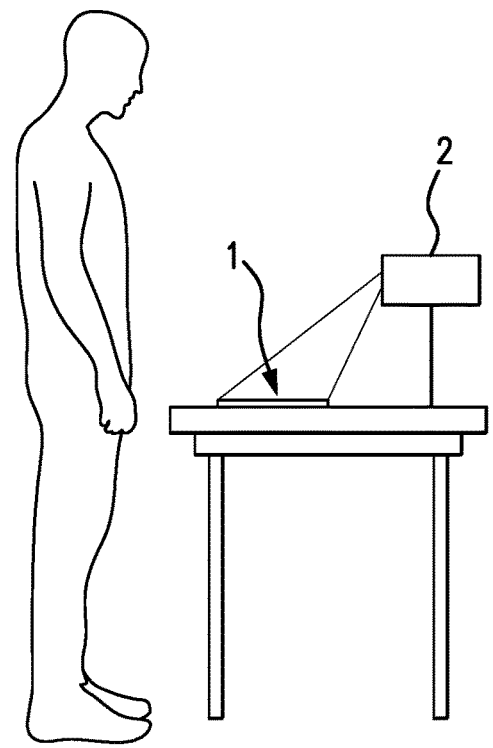
FIG. 1A shows a desktop version of the input area 1 and input device 2.
Figure 1B:
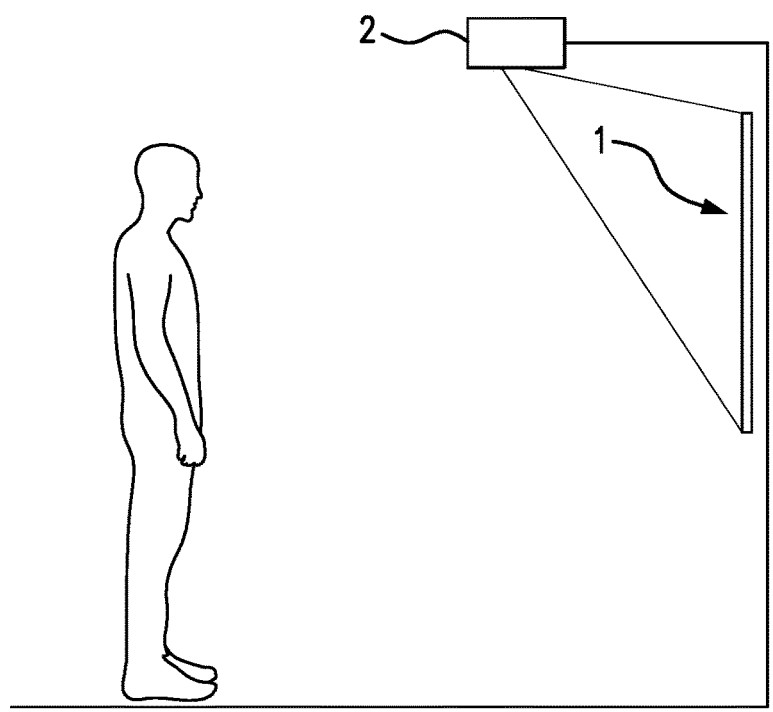
FIG. 1B shows a digital whiteboard version of the input area 1 and input device 2.
Figure 2:
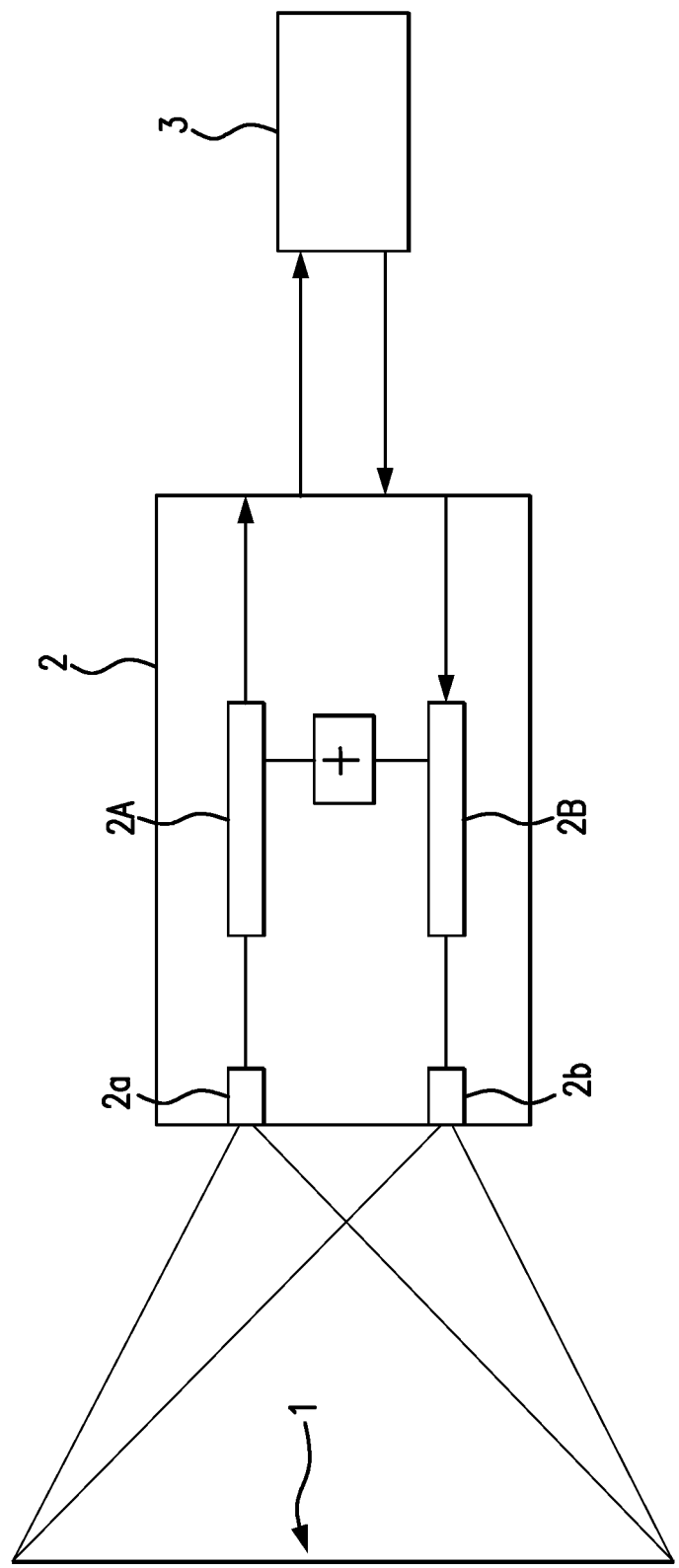
FIG. 2 depicts input area 1, as well as the internals of input device 2. Input device 2 contain camera 2a, video processor and encoder 2A, projector 2b, video decoder 2B, Feedback Prevention Module (designated as "+" in FIG. 2, and hereafter referred to as FPM), and backend system 3.

FIG. 1 shows two alternative configurations of the input device. Regarding FIG. 1, input area 1 designates the area the user is supplying input. Input device 2 includes a high-resolution projection device and a high-resolution camera covering at least the input area 1. The projected area projected by the projection device and field of view scanned by the camera are depicted by rays emanating from the center of the input device 2.

In an example input device 2, the camera captures user generated graphical content as the user starts generating content at the "top" of the input area 1, and works their way "down" input area 1. Further, the camera receives projection data and transmits captured images via standard video conferencing techniques to the backend system.

Backend system 3 is connected to the input device 2 via an internet or wireless network connection or another network option. Backend system 3 can be connected to multiple input devices. Input device 2 can optionally include audio equipment such as a microphone and audio processing unit for receiving and processing audible commands. The audio equipment can be included within a housing of input device 2, or logically associated with input device 2.

In an exemplary embodiment, input device 2 can include a network interface such that the input device can connect directly to the backend system 3. Additionally or alternatively, input device 2 can be connected to a computer (e.g., via USB or Bluetooth connection) such that a software client on the computer provides the connection to the backend system 3. Further, the computer can provide computational resources for some functions of the input device 2.

In another exemplary embodiment, input device 2 can be connected to a computer running a collaboration software (e.g., video, audio and/or web conferencing). For example, the information that is exchanged between the input device 2 and backend system 3 can be provided to the client software as raw data. The client software can transmit the information in band, through a channel to its own backend system, where the information can be extracted and provided to the backend system of the disclosed subject matter. An advantage of this approach is the requirement for fewer connections between the client side and the server side, simplifying maintenance, NAT issues, and firewall traversal.

The FPM is introduced to remedy the scenario in which a remote signal is projected and re-captured by the camera to be sent back to the network. Such a scenario creates a feedback loop, analogous to an audible echo originating from room speakers and being recaptured by the room microphone. Accordingly, the FPM identifies within the incoming camera signal any signal which was already present in the originally projected signal, and masks it from the incoming camera signal to avoid transmission to the backend system. This function can account for images that were previously projected, but appear differently than when previously captured because of (1) geometric distortions, (2) color distortion between projection, and/or (3) reflection from the object and camera capture.

In an exemplary embodiment, combinations of techniques can be used to reduce the visual feedback as part of the FPM function. Such techniques can include:

Frequent calibration of the visual field, including distortion and/or reflectivity properties. To map the topography of either the entire, or partial input area 1, a grid or other known shape can be projected periodically. If the projected shape is elaborate enough, it can also be used as a reference signal. The trigger for such calibration can include: (i) detection of significant changes in the input area 1, or (ii) detection that certain elements that are projected on an ongoing basis as part of the system normal operation are not captured by the camera in the location expected from prior calibration.

Maintain a visual "block map" of the projected image that in combination with the calibration information, is used to mask particular camera input signals and avoid the feedback.

Further gating visual input using image processing and machine learning to allow "new content" when it can be correlated with a high degree of confidence to intentional user activity (e.g., a moving hand that holds a pen).

The disclosed subject matter further relates to analysis of captured content. As the user annotates (e.g., draws, writes) the input area 1, camera 2a captures the new content and places it in a registered space. The registered space includes an artificial coordinate system relative to a frame on the page, or whiteboard being annotated by the user. The registered space can be initiated either when a user starts a clean page, erases the white board, provides an agreed audible command (e.g., "new page"), or provides another visual gesture. When initiating a registered space, the input device 2 will display an appropriate sized and located frame on the input area 1 (e.g. a clean area of input are 1, or the borders of a physical page located in input area 1), and allow the user to confirm and/or adjust the frame, via visual and/or audible cues.

Further, the disclosed subject matter provides a processing unit connected to the camera 2a. The processing units detects movement of a page or whiteboard during content capture by performing comparisons to pre-existing images of the same (i.e., the process known as 'registration' to those skilled in the art of image processing field).

The process of detecting movement can be continuous and is implemented by comparing content previously captured in the registered space, to content present in the input area. By (1) comparing an original image currently captured by the camera, (2) removing a projected image from the original image via the FPM, and (3) further removing newly created content, the input device 2 determines if user created content in the input area 1 was previously recorded in the registered space, or moved[1] and/or morphed. If such motion is detected, the input device 2 can account for this motion by updating the mapping and/or morphological transformation (e.g., stretching) between the camera capture and the registered space. Further, the map can be used to modify the projected image so that content from other users will align correctly with content from the local user.

[1]It is possible that the motion detected by the input device is associated with or caused by motion of the input device itself.

If the input device fails to match prior versions of content in the registered space to a current version of content in the visual field, the input device can prompt the user to make a manual alignment and/or assist is such an alignment. Such alignment can be accomplished by projecting only the prior image of the registered space, or otherwise ask the user to start over (by initiating a new frame).

Further, the processing unit can account for the presence of the user's hands during writing on the whiteboard such that images of the hands do not become part of the registered space. For example, the processing unit detects a user's hand motion and after the writing hand departs the input area 1, ensures that only newly written content remains. In an alternative embodiment, the input device 2 can send meta data to the backend system 3 indicating the location of the hand or writing activities in the registered space, such that the hand or writing activity can be displayed visually to other users. Thus a more natural experience is provided, whereas new content could otherwise seem to artificially appear on the blank page with no corresponding hand or tool providing the content. Display of written content can also be coded to indicate which users have generated the writing, so a viewer can decide whose work he would like to focus on.

When input device 2 is connected to a computer, that computer can include software that implements this processing, thus providing for both simpler design and lower cost for the input device 2, as well as reduced network traffic. This can be especially useful for the desktop version of input device 2.

The registered space is continuously transmitted to the backend system 3 where it is stored, mixed, and forwarded as further described. The backend system can alternatively be co-located with one of the input devices.

The disclosed subject matter further relates to a collaboration process. The backend system receives a (Registered Space), from each of the N participants. This is accomplished via relayed compressed video streams as is known to those skilled in the art. For each participant j, the backend system creates a composite of the (Registered Spaces)$_q$ such that q is 1 . . . [(j−1), (j+1)] . . . N, which is transmitted to user j via standard video communication methods. Alternatively, only a subset of the registered spaces can be composed and sent, automatically or per the selection of the user. Additionally or alternatively, some or all of the registered spaces are sent individually such that a subset of the individual registered spaces can be selectively displayed or overlaid. Overlaying of the subset of the individual registered spaces can allow a user to selectively view annotations made by only a subset of users, by specific participants, or display several images side by side (e.g., for comparison).

The disclosed subject matter further relates to user that doesn't have access to an input device 2. For such a user, it might be required to integrate the disclosed subject matter with a "Software only client". In this case the software only client can perform a function similar to the input device, wherein the projector is replaced by a simple screen display, and input from the camera is replaced with capture of a mouse, computer-based input, or a touch screen function on an electronic device running the software only client.

The disclosed subject matter further provides an interface to a legacy whiteboard or tablet. When connecting the input device to a legacy whiteboard, the following mapping can occur:
  a. The backend system will send a composited image of some or all of the participants to the legacy system, which will display it as a complete image.
  b. A user of the legacy whiteboard draws content on top of the composited image which is sent back to the backend. The difference between the sent and received images (i.e., the user's input) will be considered the registered space for the legacy user, and is reflected to the other participants connected to the backend.

The disclosed subject matter further provides for special gestures or functions. In an exemplary embodiment, the user can place a picture or an object on the input area 1, and by performing a prearranged gesture (e.g., drawing a frame around the picture or object), the camera is directed to capture an image of that picture or object which can then be removed, and replaced with a projected image. In another exemplary embodiment, the user can enable a mode in which handwriting is replaced with computer text. In another exemplary embodiment, a virtual keyboard or other controls (e.g., track area, game controls) can be invoked by the user and detected by the system, such that meta data resulting from these controls can be sent to the backend.

The disclosed subject matter further provides a backend system 3 which performs the video processing required to implement the FMP, registered space, and special gestures or functions. Accordingly, the camera module will only send continuous video stream captured front the camera, and all processing will occur in the backend. In such a configuration, the amount of hardware in the input device will be reduced. However, full motion high-resolution video can be required during transmission to the backend 3, instead of only the registered space.

The foregoing merely illustrates the principles of the disclosed subject matter. Various modifications and alterations to the described embodiments will be apparent to those skilled in the art in view of the teachings herein. It will thus be appreciated that those skilled in the art will be able to devise numerous techniques which, although not explicitly described herein, embody the principles of the disclosed subject matter and are thus within its spirit and scope.

What is claimed is:

1. An input device comprising a camera, a projector, and a Feedback Prevention Module (FPM) for remote collaboration adapted for displaying digital whiteboarding content;
  wherein the camera is adapted to provide a signal to the FPM;
  wherein the input device is connected to a backend system;
  wherein the FPM is adapted to prevent a feedback loop by analyzing the signal from the camera and masking an original portion of the signal which was previously projected, the masking preventing the original portion of the signal which was previously projected from reaching the backend system.

2. The input device of claim 1, wherein the backend system is connected to the input device by an internet or wireless network connection.

3. The input device of claim 1, wherein the input device is connected to a computer running a collaboration software including video, audio and/or web conferencing.

4. The input device of claim 1, wherein the FPM is adapted to reduce visual feedback by calibration of a visual field using distortion or reflectivity properties.

5. The input device of claim 1, wherein the FPM is adapted to reduce visual feedback by maintaining a block map of a projected image to mask a particular portion of the camera signal.

6. A system for mapping between participants comprising at least one input device, a backend system, and at least one legacy whiteboard or software only client;
  wherein the backend system is adapted to send a composited image of one or more of the participants to the legacy whiteboard or software only client, the legacy whiteboard or software only client adapted to display the composited image; and
  wherein the system is further configured such that when a legacy user of the legacy whiteboard or software only client draws content on top of the composited image, the content is sent to the backend system and a difference will be a registered space for the legacy user of the legacy whiteboard or software only client.

7. The system of claim 6, wherein the backend system is further adapted to receive a registered space from the one or more participants in the collaboration.

8. The system of claim 7, wherein the registered space from the one or more participants can be displayed or overlaid to selectively view annotations made by specific participants.

* * * * *